W. B. PROUTY.
VEHICLE BODY.
APPLICATION FILED NOV. 2, 1916.
1,305,407.
Patented June 3, 1919.
2 SHEETS—SHEET 1.
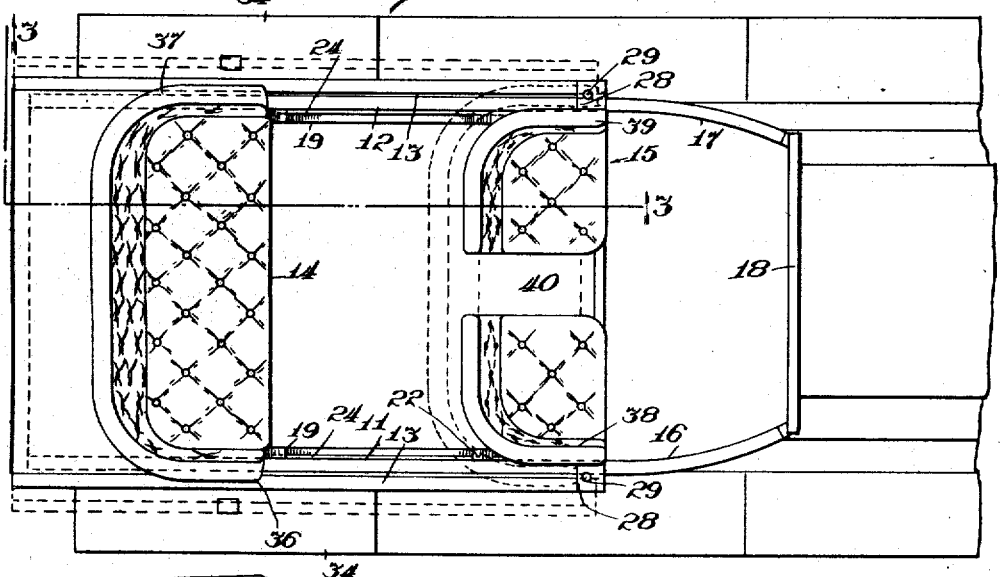
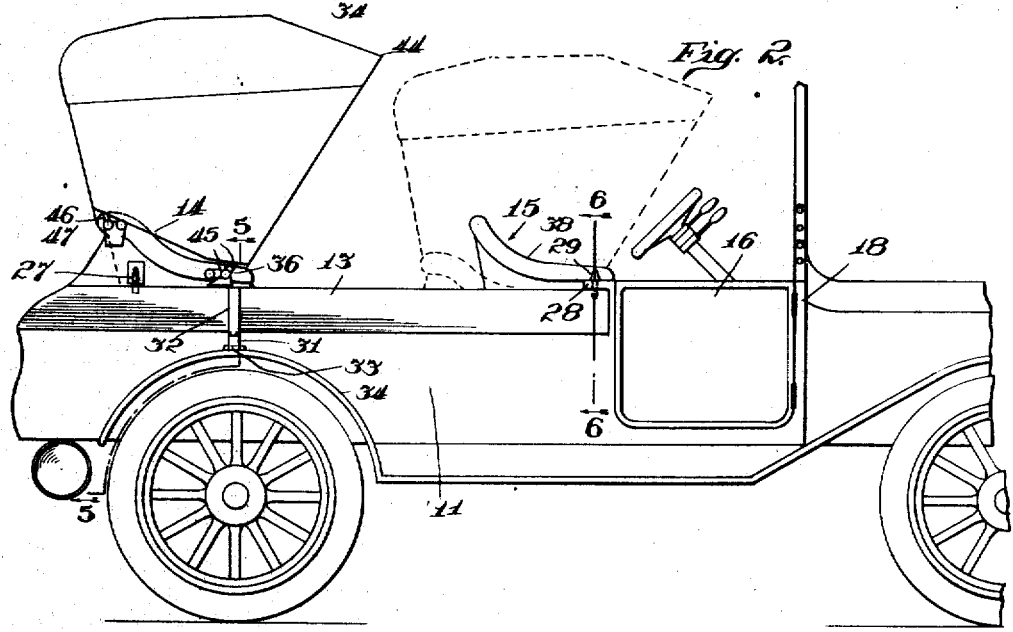
Inventor
William B. Prouty.
Gillson Gillson
Attorneys.

W. B. PROUTY.
VEHICLE BODY.
APPLICATION FILED NOV. 2, 1916.
1,305,407.
Patented June 3, 1919.
2 SHEETS—SHEET 2.
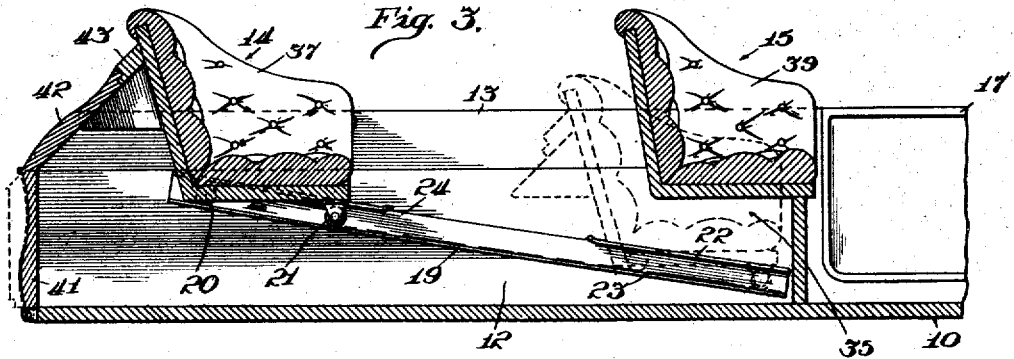
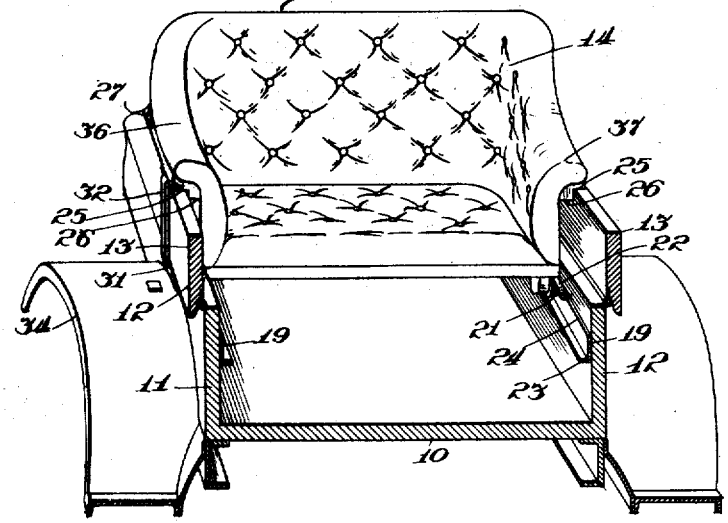
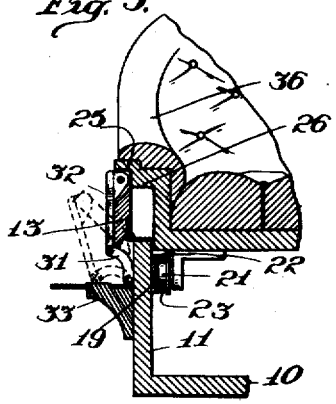
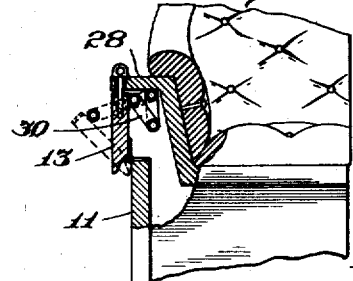
Inventor
William B. Prouty
By Gillson & Gillson
Attorneys

UNITED STATES PATENT OFFICE.

WILLIAM B. PROUTY, OF EVANSTON, ILLINOIS, ASSIGNOR TO PRESTO PASSENGER-TRUCK CO., OF CHICAGO, ILLINOIS, A CORPORATION OF DELAWARE.

VEHICLE-BODY.

1,305,407. Specification of Letters Patent. Patented June 3, 1919.

Application filed November 2, 1916. Serial No. 129,092.

*To all whom it may concern:*

Be it known that I, WILLIAM B. PROUTY, a citizen of the United States, and resident of Evanston, county of Cook, and State of Illinois, have invented certain new and useful Improvements in Vehicle-Bodies, of which the following is a specification and which are illustrated in the accompanying drawings, forming a part thereof.

The invention relates to vehicle bodies and particularly to an automobile body which may be used without the removal or addition of parts either as a truck or for the carrying of passengers. The object of the invention is to provide a convertible vehicle body of improved construction, the improvements being especially directed to affording a greater convenience in transforming the body for its different uses and rendering the body more efficient in the particular use for which each form is intended.

In the accompanying drawings,

Figure 1 is a plan view showing one form of the improved vehicle body, the arrangement of the parts for different uses being indicated by full and dotted lines, Fig. 2 is a side view showing an automobile comprising the improved body, the two positions of the parts of the body being also indicated by full and dotted lines in this figure, Fig. 3 is a sectional view taken on the line 3—3 of Fig. 1.

Fig. 4 is a detail perspective view showing some of the parts in section, the plane of the section being transversely through the vehicle body in front of the rear seat when said seat is positioned for service, and Figs. 5 and 6 are detail sectional views taken on the line 5—5 and 6—6 respectively of Fig. 2.

The floor 10, and parts, as 11—12, of the two sides of the improved vehicle body are preferably rigid and are employed in the same relative positions in both of the uses for which the body is intended. The said side parts or fixed panels 11 and 12 preferably extend from the front seat, as 15, to the rear end of the body, but rise only to a part of the full height of the sides. The remainder of each of the body sides preferably consists of a tilting board rail or extension side panel 13. As shown, the rail 13 is hingedly connected with the corresponding side part 11 or 12 at its upper edge to swing between the upright position shown in Fig. 4 and by full lines in each of Figs. 5 and 6, and the inclined position indicated by dotted lines in Figs. 5 and 6. To accommodate the rear seat 14 in each of its two positions, as hereinafter explained, each rail or side part 13 is desirably offset from the plane of the corresponding side section, 11 or 12, in its upright position. The sides of the body in front of the seat 15 will usually be closed by swinging doors, as 16—17. As shown, each of the doors, 16—17, extends from the adjacent side of the dash board, as 18, to the front end of the corresponding side part 11 or 12.

It is an important feature of the improved construction that the vehicle body may be transformed for either of its intended uses without the addition or removal of parts. The rear seat 14 is accordingly arranged to slide between a service position near the rear end of the body and a concealed position in which it nests with the front seat 15. For this purpose an inclined track 19 is secured against each of the side parts 11 and 12, upon the inside of the same, and the rear seat 14 is provided with rollers 20 and 21 at each side, for engagement with the corresponding track. Preferably each track 19 takes the form of a channel with upper and lower instanding flanges 22 and 23. Under these circumstances the rollers 20 and 21 are desirably constructed to enter the space between the two flanges 22, 23, of the corresponding track 19 and run upon the upper surface of the lower flange 23. The upper flange 22 accordingly serves to prevent disengagement of the rollers from the track. While complete removal of the rear seat from the body is not required in transforming the body for its different uses, such removal may be permitted without interfering with the positive connection of the rear seat with the body, in each of its two positions, if a portion of the upper flange 22, of each track 19 be omitted intermediate the ends of the track, as at 24 (Fig. 3). This arrangement permits of the rear seat 14 being lifted out of the body when it is substantially midway between its front and rear positions. Preferably the two rollers 20 and 21, at each side of the front seat 14, are located at different levels. The rear seat is thus supported in a horizontal position upon the inclined track throughout the entire range of movement of the seat along said track, The rear seat 14 is preferably also constructed to be additionally supported upon the body sides in each of its two positions. As shown, the two arms of the rear seat are each provided upon the outside with a pair of horizontal shoulders or ledges 25 and 26. In the service position of the rear seat each ledge or shoulder 25 rests upon the upper edge of the corresponding side rail 13. In the forward or concealed position of the rear seat 14 each ledge 26 rests upon the upper edge of the corresponding side part 11 or 12. As the rear seat 14 moves downwardly during its travel forwardly from the service to the concealed position it follows that this movement cannot be accomplished until the two side rails 13 have been swung outwardly to the dotted lines position indicated in Figs. 5 and 6. Similarly the side rails 13 cannot be swung inwardly to the upright position shown in Fig. 4 until the rear seat 14 has been completely returned to its service position. It also follows that the rear seat 14 may be locked against movement in its service position if provision is made for holding the side rails 13 from disengagement with the ledges 25.

As shown, a sliding bolt 27 is mounted upon the rear seat 14 at each side for entering the top of the corresponding side rail 13. As the bolts 27 are engaged with the side rails 13 near the rear end of the vehicle body, a locking means for holding the side rails 13 in their upright position is preferably also provided near the front ends of the said rails. As shown, the sides of the front seat 15 are extended outwardly over the rails 13, as at 28 (Fig. 6), and a pin 29 passes through each of these lateral extensions from the sides of the front seat into the corresponding side rails 13.

Since the side rails 13 may be required to support a considerable part of the weight of the lading when the improved body is used as a truck, a firm support for these rails should be provided in their inclined position. Such a support is readily provided near the front end of each side rail 13 by extending a jointed link 30 between the side railing and the adjacent side of the front seat 15. In order that supports for the side rails 13, in their inclined position, which are in rear of the front seat 15, may not interfere with the lading they should be located upon the outside of the vehicle body.

As shown, a pair of toggle links, 31 and 32, are extended between each side part, as 11, and the upper edge of the corresponding side rail 13 and a bracket 33 is mounted upon the side part, as 11, below the said links for limiting their downward movement. In the upright position of the side rail 13 the link 32 lies flat against the said rail upon the outside and the link 31 resembles an ornamental bracket extending between the corresponding side part, as 11, and the lower end of the link 32. In the inclined position of the side rail 13 the lower end of the link 32 rests upon the bracket 33. If desired the bracket 33 may be substantially concealed by the fender, as 34. As shown, the bracket 33 is located under the fender 34 and projects through the same only at the place where it is engaged by the link 32.

The inclination of the track 19 is preferably such as to bring the rear seat 14, in its forward position, to a level which is sufficiently low to permit the bottom of the rear seat to enter the space, as 35, below the bottom of the front seat 15. A complete nesting of the rear seat with the front seat is thereby accomplished by making the front seat of such reduced width that the arms, as 36—37, of the rear seat, may extend about the arms, as 38—39, of the front seat. The improved vehicle body is thus arranged for use as a truck with nearly as much space available to the lading as would be the case if the front seat 15 were alone provided. As the side parts, 11 and 12, and the two side rails 13 are desirably made continuous the occupants of the rear seat 14 preferably enter through the same door 16 or 17 with the occupants of the front seat 15. The front seat 15 should accordingly be constructed to provide a passageway through said seat. One way in which this may be accomplished is by forming the said seat with a central opening 40 which extends entirely through the same. This central opening through the front seat 15 also contributes to the convenience with which the rear seat 14 may be moved from its concealed to its service position. That is to say, in the concealed position of the rear seat its front edge is exposed at the opening 40 and the operator has only to press against the front edge of the rear seat at this exposed part for moving the rear seat backwardly upon the track 19. As the rear seat moves backwardly upon the track the operator has only to pass through the opening 40 to continue the movement.

The improved body is equipped with an end gate 41 and any convenient means may be employed for extending this end gate to cover the space behind the rear seat 14 when the body is used for passengers. As shown, a panel 42 is hingedly connected with the end gate 41 along the upper edge of the latter. When the device is used as a truck the panel 42 is folded against the end gate 41 upon the outside. When passengers are to be carried the panel 42 is folded upwardly and forwardly and joins a part 43 which projects rearwardly from the back of the rear seat 14. The folding of the panel 42 to the position indicated by dotted lines in Fig. 3 serves to conceal those surfaces of both the panel and the end gate 41 which are finished to present an attractive appearance when the parts are arranged for use by passengers. Injury to these finished surfaces when the parts are arranged for use as a truck is accordingly prevented. The appearance of the body is improved, when the parts are arranged for carrying passengers, if the rear ends of the side rails 13 are chamfered to terminate flush with the outer face of the panel 42. The construction provides a vehicle body which is of attractive appearance when the parts are arranged for carrying passengers, but which is nevertheless thoroughly practical for use as a truck body without injury to the seats or other appurtenances pertaining only to the carrying of passengers.

If desired the same top, as 44, may be used both for covering the rear seat 14, when positioned for service, and for covering the front seat 15 when the rear seat 14 occupies its concealed position. For this purpose the top 44 is attached to the frame of the rear seat 14. It is conventionally represented as comprising the stay ribs 45 and 46, and as being of only sufficient length to afford protection for the occupants of one seat. The stay ribs 45 and 46 rise from the arms 36—37, and back 47, of the rear seat. If desired they may be hingedly connected to these parts to permit folding in a well known manner. Preferably the stay ribs 45 and 46 will be of sufficient length to render the top high enough to suit the convenience of the occupants of the front seat 15 when the top is extended over said seat by movement of the rear seat to the position indicated by dotted lines in Figs. 1 and 3.

I claim as my invention,

1. The combination with a vehicle body of a fixed front seat and a movable rear seat each facing forwardly in the body at all times, the said rear seat comprising a bottom, arms at each side of the bottom and a back, and the width of the rear seat between the arms being as great as the full width of the front seat, an inclined track slidingly supporting the rear seat for movement between a service position in rear of the front seat and a concealed position in which the bottom of the rear seat extends under the front seat and the arms of the rear seat extend about the sides of the front seat, said track being provided with guard rails adjacent each end of the track adapted to prevent said rear seat moving away from said track in both service and concealed positions while allowing upward movement of said seat when in an intermediate position.

2. The combination with a vehicle body comprising a pair of fixed upright side panels and a pair of extension side panels each hingedly connected with one of the fixed side panels along its upper edge, of a movable seat having ledges at each side for engagement with the upper edges of the corresponding extension panels of the body in a service position of the seat at one end of the body when the said extension panels are upright and with the upper edges of the corresponding fixed panels of the body in a depressed position of the seat at the other end of the body when the said extension panels are swung outwardly and an inclined track slidingly supporting the seat for movement between the said two positions.

3. The combination with a vehicle body comprising a pair of fixed upright side panels and a pair of extension side panels each hingedly connected with one of the fixed side panels along its upper edge, of a fixed front seat and a movable rear seat each facing forwardly at all times, the said rear seat comprising a bottom, arms at each side of the bottom and a back and the width of the rear seat between the arms being as great as the full width of the front seat, and ledges formed upon the arms of the rear seat for engagement with the upper edges of the corresponding extension panels of the body in a service position of the rear seat in rear of the front seat when the said extension panels are upright and with the upper edges of the corresponding fixed panels of the body in a concealed position of the rear seat with the bottom of the rear seat extending under the front seat and the arms of the rear seat extending about the sides of the front seat when the said extension panels are swung outwardly.

4. The combination with a vehicle body, comprising a pair of fixed upright side panels and a pair of extension side panels, each hingedly connected with one of the fixed side panels along its upper edge, of a movable seat, appurtenances of said seat extending over the upper edges of corresponding extension panels while said seat is in a service position at the rear of the body and over the corresponding upper edges of the fixed panels while the seat is in a depressed position at the other end of the body with the extension panels swung outwardly clearing said arms.

5. A vehicle body comprising fixed side panels, movable extension side panels hingedly secured to said fixed panels and operable in an upright and in a lowered position, a seat movable to and from a service position at the rear of the body, means to hold the extension panels upright while the seat is in its service position and means to hold the extension panels in the lowered position when said seat is out of service position.

WILLIAM B. PROUTY.